May 6, 1930.  E. G. WEST  1,757,788
ANTIAIRCRAFT SHELL
Filed March 5, 1928   3 Sheets-Sheet 1
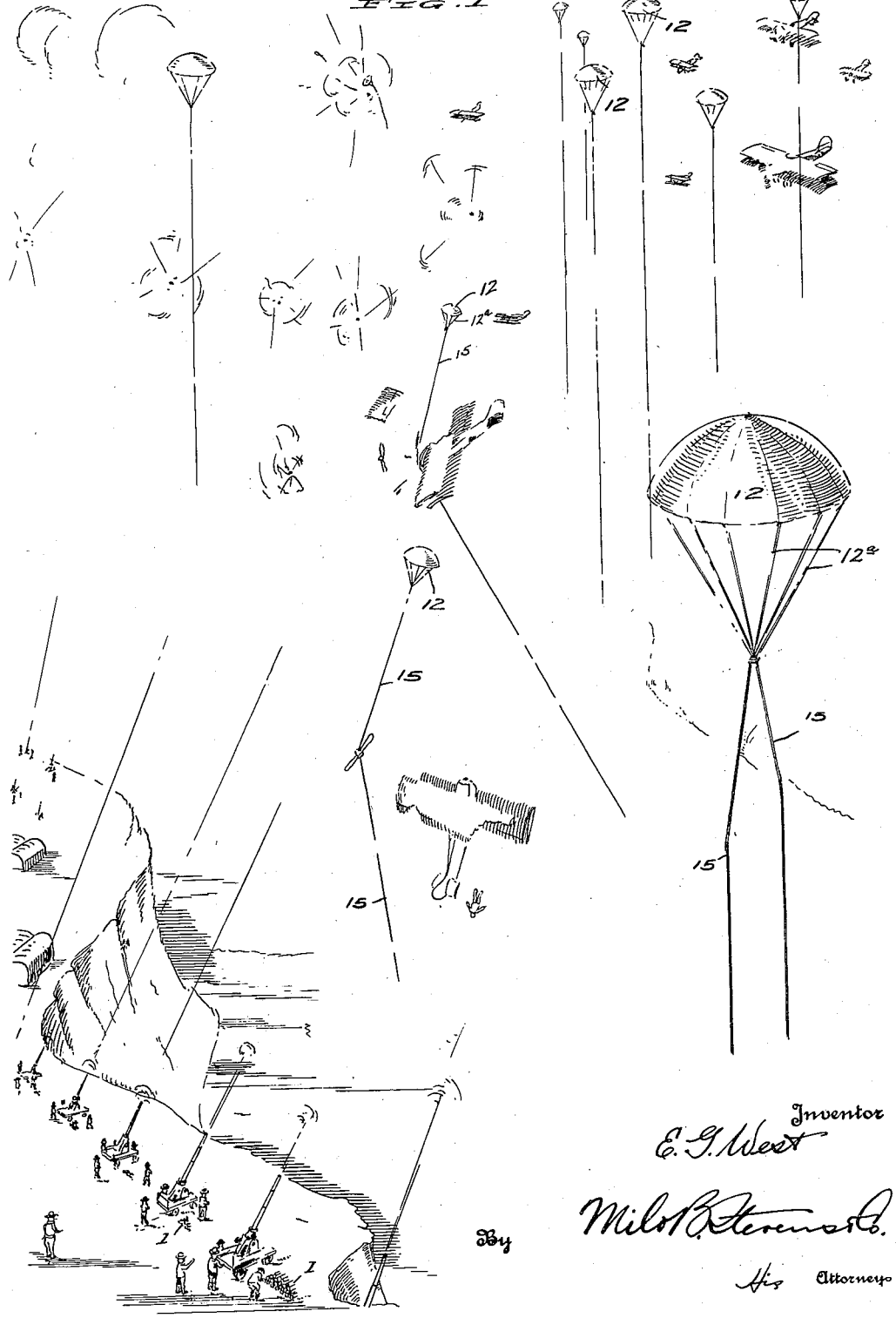

May 6, 1930. E. G. WEST 1,757,788
ANTIAIRCRAFT SHELL
Filed March 5, 1928 3 Sheets-Sheet 2
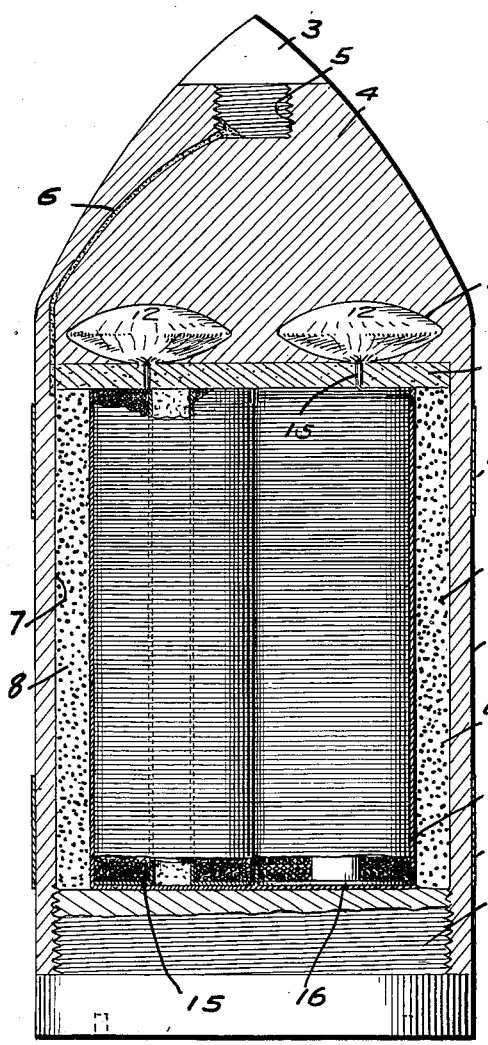
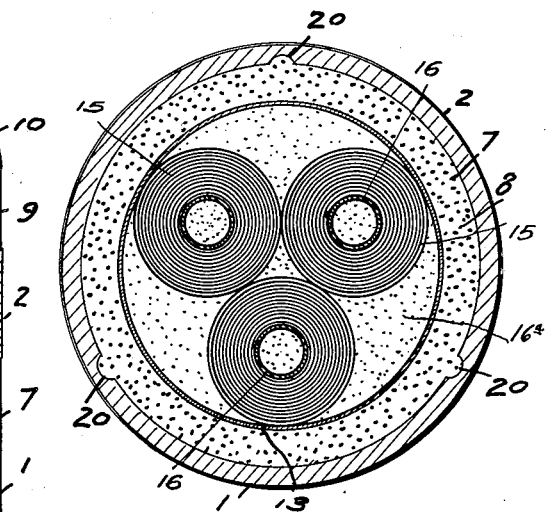
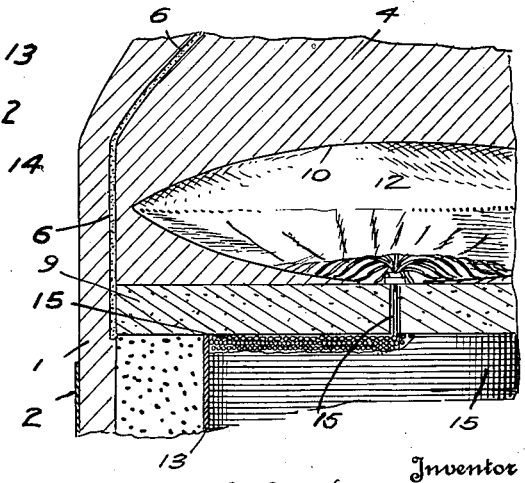

May 6, 1930. E. G. WEST 1,757,788
ANTIAIRCRAFT SHELL
Filed March 5, 1928  3 Sheets-Sheet 3
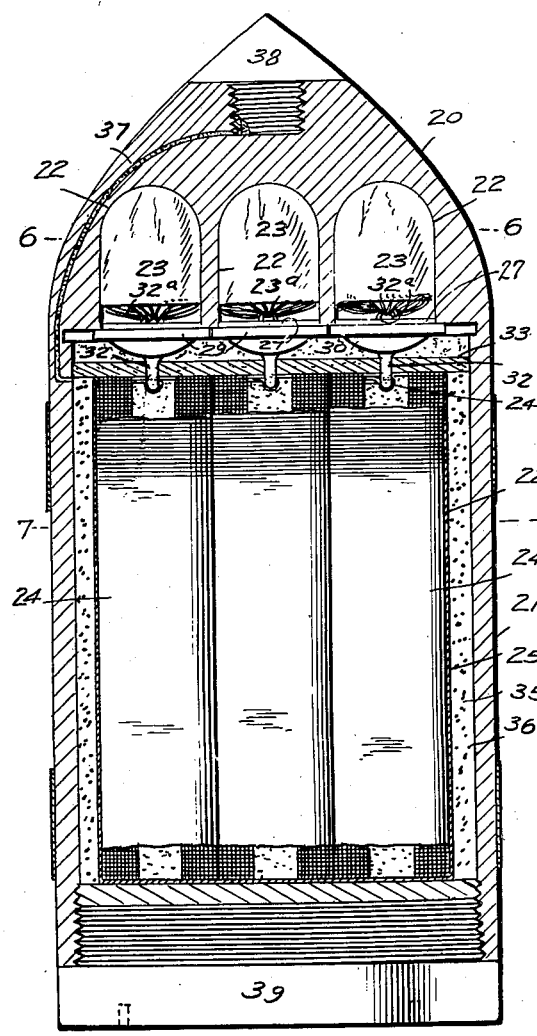
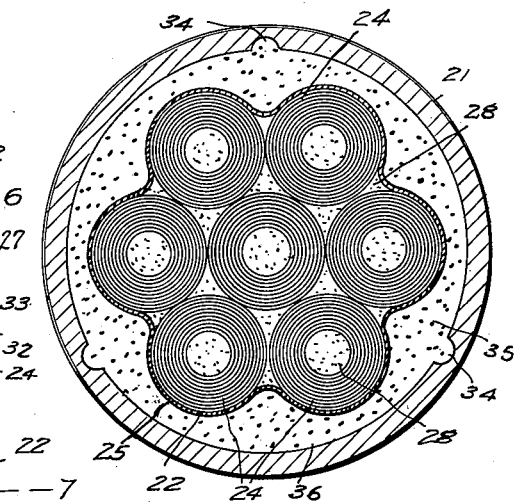
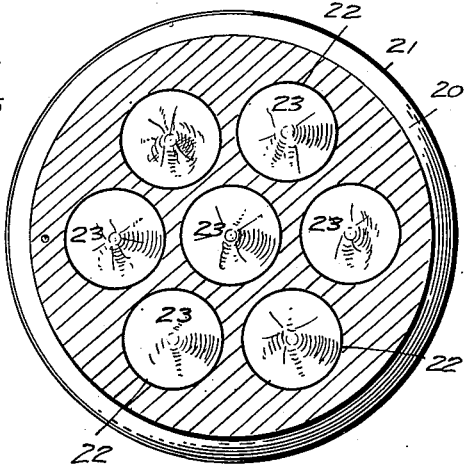
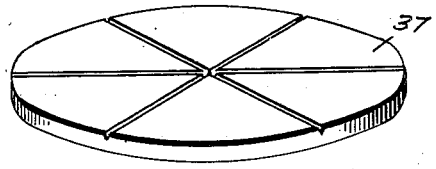

Patented May 6, 1930

1,757,788

UNITED STATES PATENT OFFICE

ERASMUS G. WEST, OF CARMICHAELS, PENNSYLVANIA

ANTIAIRCRAFT SHELL

Application filed March 5, 1928. Serial No. 259,193.

My invention relates to improvements in shells or projectiles and has for its primary object the provision of a novel and improved shell which is especially adapted for anti-aircraft work.

More specifically, it is an object of the invention to provide a shell of the kind stated which will be effective for disabling aircraft or obstructing the maneuvers thereof even in the absence of a direct hit and even when the shell explodes at a point remote from the aircraft.

More specifically, it is an object of the invention to provide an anti-aircraft shell having one or a plurality of retarded descent obstructions or aircraft disabling expedients which are rendered effective for the purpose specified upon the bursting of the shell.

With the foregoing objects in view and others which will suggest themselves as the description proceeds, the invention resides in certain novel constructions, combinations and arrangements of the various parts, including modes of operation, etc.,—and in order that the same may be better understood reference should be had to the accompanying drawings, which illustrate the now preferred embodiment of the invention.

It is to be understood that the invention is capable of many other mechanical expressions within the scope of the subject matter claimed and I, therefore, do not limit myself to the particular embodiments herein disclosed.

In the drawings, wherein the same reference characters have been used to designate the same parts in all views, Figure 1 is a panoramic view illustrating the projectile constructed in accordance with my invention minus the cartridge or casing which remains in the gun;

Figure 2 is a longitudinal sectional view of a form of the invention.

Figure 3 is a cross section therethrough;

Figure 4 is an enlarged fragmentary sectional view showing one of the parachutes and the protective housing means therefor;

Figure 5 is a longitudinal sectional view of a modified form of the invention;

Figure 6 is a cross section on line 6—6 of Figure 5 showing the parachute chambers;

Figure 7 is a cross section on the line 7—7 of Figure 5; and,

Figure 8 is a perspective view of a closure for the wire coil receptacle and made up of a plurality of sector-shaped sections for use with or in lieu of the frangible partition.

Referring specifically to the drawings, 1 designates the shell casing, which may be of any preferred form, there being provided the usual encircling copper bands for cooperating with the rifling of the gun barrel, as indicated by reference character 2. The time fuse 3 in Figure 2 is shown screwed into the nose 4 of the shell, the latter having a threaded socket 5 for receiving the shank portion of the fuse. From the socket 5 there leads a small passage 6 which communicates with the annular space 7 containing the bursting charge 8.

Rearwardly of the nose 4 there is provided a partition 9 of terra cotta, bakelite or similar readily pulverizable material. This is in flat contact with the rear face or surface of the nose which defines the forward end of the main chamber of the shell.

The rear face of the nose 4 is provided with one or more substantially oval recesses 10 having relatively constricted outlets 11,—these recesses 10 being adapted to accommodate parachutes 12 the purpose of which will be more readily understood as the description proceeds.

As has been previously stated, the bursting charge 8 is located in an annular chamber 7. The inner wall of this chamber is defined by the cylindrical wall of a receptacle 13, which is preferably made of comparatively heavy metal. This receptacle is preferably open at its forward end and closed at its rear end, being held in place with its forward end against the partition 9 by means of the base portion 14 of the shell, which is adapted to be screwed into the rear end, as shown.

The receptacle 13 is adapted to contain one or more cylindrical coils 15 of wire. The wire 15 may be wound upon a spool 16,—or if there are a plurality of wire strands there will preferably be a separate spool for each strand. The space within the container 13 which is not occupied by the spool or coils of wire 15 is filled up with sand 16a, as best shown in Figure 2. The wire strands from the coil or coils 15 are passed through apertures 17 in the frangible partition 9 and secured to the supporting wires 12a of the parachutes 12 in the chambers 10.

The mode of operation is as follows: The gun is fired, as usual, at the aerial target and preferably considerably in advance thereof and above the same. After the passage of a predetermined interval of time or after the shell has traveled a predetermined distance the time fuse explodes igniting the bursting charge 8 in the annular chamber 7 surrounding the receptacle 13. The bursting charge is not heavy, being only of sufficient strength to rupture the shell casing 1 and the walls of the container or receptacle 13 in addition to the frangible partition 9. The shell having bursted, as aforedescribed, the parachute or parachutes are pulled out of the compartments in the rear face of the head 4 and are opened by the weight of the wire as the latter descends and unrolls. The wire 15 is adapted to become entangled in the propeller or other parts of the engines of aircraft thereby disabling the same and causing the aircraft to make forced landings.

I have shown the wires 15, as being free of auxiliary impediments, but obviously it is well within the scope of the invention to provide the wires with barbs, hooks or the like for catching in the fuselage or other parts of the aircraft than the propeller.

Preferably the body of the shell 1 is provided with longitudinally scored or weakened portions 20 arranged about 90° apart so as to insure bursting of the shell without injury to the parachute or wire.

The wall of the receptacle 13 is substantial enough to withstand the explosive force of the bursting charge 8 so as to protect the coils of wire 15. Also as will be noted from Figure 2, the cylindrical wall of receptacle 13 restricts the width of the bursting charge chamber 7 and locates the same well outwardly of the openings 11 of the parachute chambers or recesses 10. Thus, the explosion of charge 8 will not damage the parachutes 12.

The operation is simple. The shell bursts shattering casing 1 and partition 9. The receptacle 13 drops off and the coils of wire 15 being relatively heavy unwind very rapidly. Manifestly the explosion will dislodge the parachutes 12 from their chambers 10. These quickly open in an obvious manner.

The partition 9 serves as a protective buffer or cushion for the rear face of nose 2 so as to obviate danger of the outer walls of the recesses 10 caving in on explosion of the shell.

Figures 5, 6 and 7 show a modified form of the invention wherein the nose 20 of casing 21 has in its rear face a plurality of chambers 22 for parachutes 23. Seven chambers 22 are shown and likewise seven coils of wire 24 in the receptacle 25 in the main chamber of shell body 21. Receptacle 25 is preferably corrugated and shaped, as shown, to conform to the outer contour of the assembled coils of wire 24. Sand 28 is used to fill up cores of coils and spaced therebetween.

Each parachute chamber 22 has a closure 29 with a boss 27 to rest in the chamber mouth and also a substantially semi-spherical rear face 30 with a medial rearwardly projecting knob 32 which is apertured for attachment of the wire 24. The inner face of each closure 32 has a knob 32a to engage parachute wires 23a. Knobs 32 project into the core spaces of coils of wire 24 and through an intermediate frangible partition 33. The space between closures 29 and partition 33 is preferably filled with ground asbestos or sand, as shown, to serve a protective and insulating means for the parachutes 23.

The outer wall of the shell body 21 is weakened as at 34 and the bursting charge 35 is in the chamber 36 between the receptacle and casing wall. Partition 33, the closures 29 and the interposed sand 28 protect parachutes 23 as will be apparent. Receptacle 25 may have a closure 37 formed of a plurality of sector-shaped sections, as shown in perspective in Figure 8. This is non-essential.

The operation is, of course, the same as with the first described form of invention. The last form is adapted for 6" and 8" shells. The fuse passage is shown at 37,—the time fuse at 38 and the threaded removable shell end at 39.

It is to be understood that while the invention is primarily designed as an anti-aircraft shell,—yet it is not limited to such use,—since various combinations and subcombinations of the novel features may be used for other purposes.

Having thus described my invention, what I claim as new and desire to secure by Letters Patent is:

1. An anti-aircraft shell comprising a casing or projectile and having a main compartment extending throughout the major portion of the length thereof, a container in said compartment and spaced from the wall thereof, a bursting charge in the space between the wall of said container and the wall of said compartment, the shell having means for igniting said bursting charge, said chamber terminating a substantial distance from the nose portion of said shell and the latter having a parachute receiving recess therein, a parachute in said recess, and impedimenta in said container and attached to said parachute, the bursting charge space or chamber being laterally spaced from the mouth of said parachute receiving recess.

2. An anti-aircraft shell comprising a casing or body and having a main compartment extending throughout the major portion of the length thereof, a container in said compartment and spaced from the wall thereof, a bursting charge in the space between the wall of said container and the wall of said compartment, the shell having means for igniting said bursting charge, said chamber terminating a substantial distance from the nose portion of said shell and the latter having a parachute receiving recess therein, a parachute in said recess, and impedimenta in said container and attached to said parachute, the bursting charge space or chamber being laterally spaced from the mouth of said parachute receiving recess, and a frangible partition at the forward end of said chamber, said partition having openings for the passage of said impedimenta for connection with the parachute.

3. A shell having a body, a bursting charge therein, a parachute in said shell, means for protecting said parachute against destruction when the shell bursts said bursting charge being located out of alinement with said parachute and impedimenta attached to said parachute.

4. A shell comprising a body, a parachute in said shell, means for protecting said parachute against destruction when the shell bursts, impedimenta attached to said parachute, a casing for receiving said impedimenta, said shell having a chamber adapted to receive said casing, the cross sectional dimension of said casing being less than the similar dimension of said chamber, a bursting charge between the wall of said casing and the wall of said chamber, and the wall of said casing being spaced laterally of the space occupied by the parachute.

5. A shell comprising a casing and having a solid nose portion and a chamber extending rearwardly from said portion, the nose portion having a parachute receiving recess communicating with said chamber, extendible impedimenta secured to said parachute and carried in said chamber, means for protecting said impedimenta from the effect of the bursting charge of the shell, said means being located outwardly of said parachute receiving recess and protecting the parachutes therein from the bursting effect of the shell.

6. A shell comprising a casing and having a solid nose portion and a chamber extending rearwardly from said portion, the nose portion having a parachute receiving recess communicating with said chamber, extendible impedimenta secured to said parachute and carried in said chamber, means for protecting said impedimenta from the effect of the bursting charge of the shell, said means being located outwardly of said parachute receiving recess and protecting the parachutes therein from the bursting effect of the shell, a base portion threaded into the rear end of said shell and holding said impedimenta in place.

7. A shell comprising a casing and having a solid nose portion and a chamber extending rearwardly from said portion, the nose portion having a parachute receiving recess communicating with said chamber, extendible impedimenta secured to said parachute and carried in said chamber, means for protecting said impedimenta from the effect of the bursting charge of the shell, said means being located outwardly of said parachute receiving recess and protecting the parachutes therein from the bursting effect of the shell, a base portion threaded into the rear end of said shell and holding said impedimenta in place and a frangible protected partition disposed against the forward end of said chamber and substantially sealing said parachute receiving recesses, said partition having an opening for connection of said impedimenta with the parachute in said recess.

8. A shell comprising a body having a solid forward end and a chamber extending rearwardly therefrom, a parachute receiving recess in said forward end and communicating with said chamber, said shell having a bursting charge circumferentially arranged adjacent the outer wall of the shell and within said chamber, a parachute in said recess and having attaching connections, a closure for said recess and to which said connections are attached, extensible impedimenta in said chamber, the opposite face of said closure having means for attachment of said impedimenta thereto, a confining wall within said chamber and spaced from the main wall thereof, said confining wall serving to hold said impedimenta spaced from the wall of said chamber and the bursting charge adjacent the same, and means for holding the impedimenta closure and parachute assembled within said shell.

9. A shell comprising a body having a solid forward end and a chamber extending rearwardly therefrom, a parachute receiving recess in said forward end and communicating with said chamber, said shell having a bursting charge circumferentially arranged adjacent the outer wall of the shell and within said chamber, a parachute in said recess and having attaching connections, a closure for said recess and to which said connections are attached, extensible impedimenta in said chamber, the opposite face of said closure having means for attachment of said impedimenta thereto, a confining wall within said chamber and spaced from the main wall thereof, said confining wall serving to hold said impedimenta spaced from the wall of said chamber and the bursting charge adjacent the same, means for holding the impedimenta closure and parachute assembled within said shell, a frangible partition adjacent said closure, the closure having a spherical surface adjacent said partition and extending in the direction of the rear end of said chamber, and insulating filling between said partition and said closure.

10. A shell comprising a body, a parachute in said shell, means for protecting said parachute against destruction when the shell bursts, weighted means attached to said parachute, a casing for receiving said weighted means, said shell having a chamber adapted to receive said casing, the cross sectional dimension of said casing being less than the similar dimension of said chamber, a bursting charge between the wall of said casing and the wall of said chamber, and the wall of said casing being spaced laterally of the space occupied by the parachute.

11. A shell comprising a casing and having a solid nose portion and a chamber extending rearwardly from said portion, the nose portion having a parachute receiving recess communicating with said chamber, extendible weighted means secured to said parachute and carried in said chamber, means for protecting said weighted means from the effect of the bursting charge of the shell, said means being located outwardly of said parachute receiving recess and protecting the parachutes therein from the bursting effect of the shell.

In testimony whereof I affix my signature.

ERASMUS G. WEST.